United States Patent
Al-Araji et al.

(10) Patent No.: US 6,559,756 B2
(45) Date of Patent: May 6, 2003

(54) INGRESS MONITORING DEVICE IN A BROADBAND COMMUNICATIONS SYSTEM

(75) Inventors: Saleh R. Al-Araji, Alpharetta, GA (US); Paul E. Quesenberry, Marietta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 76 days.

(21) Appl. No.: 09/880,455

(22) Filed: Jun. 13, 2001

(65) Prior Publication Data

US 2002/0190846 A1 Dec. 19, 2002

(51) Int. Cl.[7] ................................................. G08B 9/00
(52) U.S. Cl. .................. 340/286.01; 725/107; 725/108; 359/143; 455/63; 455/67.1; 455/423
(58) Field of Search ........................... 340/286.01, 541, 340/545.4, 531; 370/248, 252, 486; 725/105, 107, 108; 359/143, 146; 455/63, 67.1, 423, 425

(56) References Cited

U.S. PATENT DOCUMENTS

| | | | | | |
|---|---|---|---|---|---|
| 4,810,898 A | * | 3/1989 | Rocci et al. | ................ | 307/115 |
| 5,719,872 A | * | 2/1998 | Dubberly et al. | ........... | 370/487 |
| 5,930,231 A | * | 7/1999 | Miller et al. | ................ | 370/210 |

* cited by examiner

*Primary Examiner*—Toan Pham
(74) *Attorney, Agent, or Firm*—Hubert J. Barnhardt, III; Kenneth M. Massaroni; Shelley L. Couturier

(57) ABSTRACT

An ingress monitoring device (400) for monitoring and detecting reverse signals that may include ingress signals. The ingress monitoring device (400) includes a processor (430) for resolving the reverse signals into predetermined sub-bands at a first resolution. A power computation circuit (435) computes a power level for each of the sub-bands. A threshold comparison circuit (445) then compares the power level that is indicative to the power level of the ingress signals for each of the sub-bands with a predetermined threshold value. When ingress signals are detected by the ingress monitoring device (400), an alarm signal is sent that indicates the specific communications equipment in which the ingress signals have been detected.

16 Claims, 7 Drawing Sheets

INGRESS MONITORING DEVICE IN A BROADBAND COMMUNICATIONS SYSTEM

FIELD OF THE INVENTION

This invention relates generally to broadband communications systems, such as hybrid/fiber coaxial (HFC) systems, and more specifically to an ingress monitoring device that is used in the broadband communications system.

BACKGROUND OF THE INVENTION

FIG. 1 is a block diagram illustrating an example of one branch of a conventional broadband communications system, such as a two-way hybrid/fiber coaxial (HFC) system, that carries optical and electrical signals. Such a system may be used in, for example, a cable television network; a voice delivery network, such as a telephone system; and a data delivery network to name but a few. The communications system 100 includes headend equipment 105 for generating forward signals (e.g., voice, video, or data signals) that are typically transmitted as optical signals in the forward, or downstream, direction along a first communication medium 110, for example, transmitting such signals at a 1550 nano meter (nm) wavelength over fiber optic cable. Coupled to the headend equipment 105 are hubs 115 that include equipment that further transmits the optical signals over a second communication medium 120. The second communication medium 120 may transmit, for example, 1310 nm signals over fiber optic cable.

The signals are then transmitted to an optical node 125 that converts the optical signals to radio frequency (RF), or electrical, signals. The electrical signals are further transmitted along a third communication medium 130, such as coaxial cable, and are amplified and split, as necessary, by one or more distribution amplifiers 135a–c positioned along the communication medium 130. Taps 140 then further split the forward signals for provision to subscriber equipment 145, such as set-top terminals, computers, telephone handsets, modems, and televisions. It will be appreciated that only one branch connecting the headend equipment 105 with the plurality of subscriber equipment 145 is shown for simplicity; however, there are typically several different branches connecting the headend equipment 105 with several additional hubs 115, optical nodes 125, amplifiers 135a–c, and subscriber equipment 145.

In a two-way system, the subscriber equipment 145 can also generate reverse signals that are transmitted upstream through the reverse path to the headend equipment 105. Such reverse signals may be combined via the taps 140 and passive electrical combiners (not shown) with other reverse signals and then amplified by any one or more of the distribution amplifiers 135a–c. The electrical signals are typically converted to optical signals by the optical node 125 before being provided to the headend equipment 105. It will be appreciated that in the electrical, or coaxial cable, portion of the network 100, the forward and reverse path signals are carried along the same coaxial cable 130. In contrast, the reverse optical signals are typically carried along a different reverse fiber (not shown) than the forward fiber 120, 110 carrying forward optical signals.

In addition to reverse signals emanating from subscriber equipment 145, unwanted ingress, or excess noise, may also be transmitted along the reverse path that affects the quality of the reverse signals. The more complex and efficient the modulation scheme, such as quadrature amplitude modulation (QAM) signals, the more ingress will affect the quality of received signals. A large portion of the reverse ingress enters the system through, for example, defective connectors and poorly shielded cable and components located in the coaxial portion of the network 100. As a result, a great deal of effort has been devoted to understanding and quantifying ingress. Studies have shown that the majority of ingress originates at or around the subscriber's premise. For example, electric motors, radio transmitters, CB radios, and automobile ignitions when activated may cause ingress at a faulty point in the cable or connectors. Unfortunately, however, ingress varies substantially from system to system, from hour to hour, and from day to day. It will be appreciated that though noise signals travel along both the forward and reverse paths, ingress signals affect the reverse path.

To mitigate the effects of ingress on the quality of signals received at the headend, operators can improve the quality of connectors and cable used during the initial installation of the system. They can also ensure that the connectors are properly fitted and sufficiently tight. Moreover, the operator can allocate reverse signals to higher frequencies within the reverse band. For example, a typical reverse band may be from 5 Mega Hertz (MHz) to 42 MHz. An operator may then allocate high-speed, complex signals that carry high-priority signals, such as impulse pay-per-view or cable modem signals, to the higher frequencies within the reverse band. In comparison, low-speed, rugged signals that carry low-priority or repetitive traffic, such as system management signals, can be transmitted in the lower more easily susceptible frequencies in the reverse band.

Conventionally, ingress troubleshooting is difficult and cumbersome, and typically only begins when a subscriber calls in with a service problem that they may be experiencing. A headend technician and field technicians then have to work cooperatively to locate the point of ingress. A headend technician may, for example, connect a spectrum analyzer to receiver equipment and analyze the power spectrum of each frequency within the band (i.e., from 5 MHz to 42 MHz) as the field technicians disconnect the reverse path in various locations along the affected branch until the ingress is located. More specifically, ingress is displayed on a spectrum analyzer as unwanted signals between the expected noise floor and the signals within the expected frequency for each particular channel. When the field technician disconnects the reverse path in certain areas, the headend technician monitors the spectrum analyzer for the disappearance or appearance of the ingress. One of the major difficulties in locating the point of ingress, however, is that ingress is fleeting; it is not a constant that can easily be viewed at all times. Therefore, the ingress may not be present when the technicians are trying to locate the faulty point. Another inconvenience is that the reverse path is disconnected for the period of time it takes to consult the spectrum analyzer for each frequency level. Consequently, locating the point and cause of ingress takes a tremendous amount of time, money, and dissatisfied subscribers along the entire reverse path branch.

Therefore, what is needed is a device and a system that is able to quickly determine the general point of ingress without the need of several technicians in the field and, additionally, without having to wait for the customer's service call. The device may also quantify the ingress and return statistical data that may be of use for the operator regarding the conditions in the system.

DETAILED DESCRIPTION OF A PREFERRED EMBODIMENT

The present invention and additional overview sections will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiment set forth herein; rather, the embodiment is provided so that this disclosure will be thorough and complete, and will fully convey the scope of the invention to those skilled in the art. For example, the preferred embodiment set forth herein refers to an ingress monitoring device that monitors communications equipment in a broadband communications system for reverse path ingress. The present invention may be installed in, for example, an amplifier or an optical node. The present invention may also include the ability to gather certain data specifying the type, the location, and the level of the ingress signals.

Overview of Status Monitoring

Figure 1:
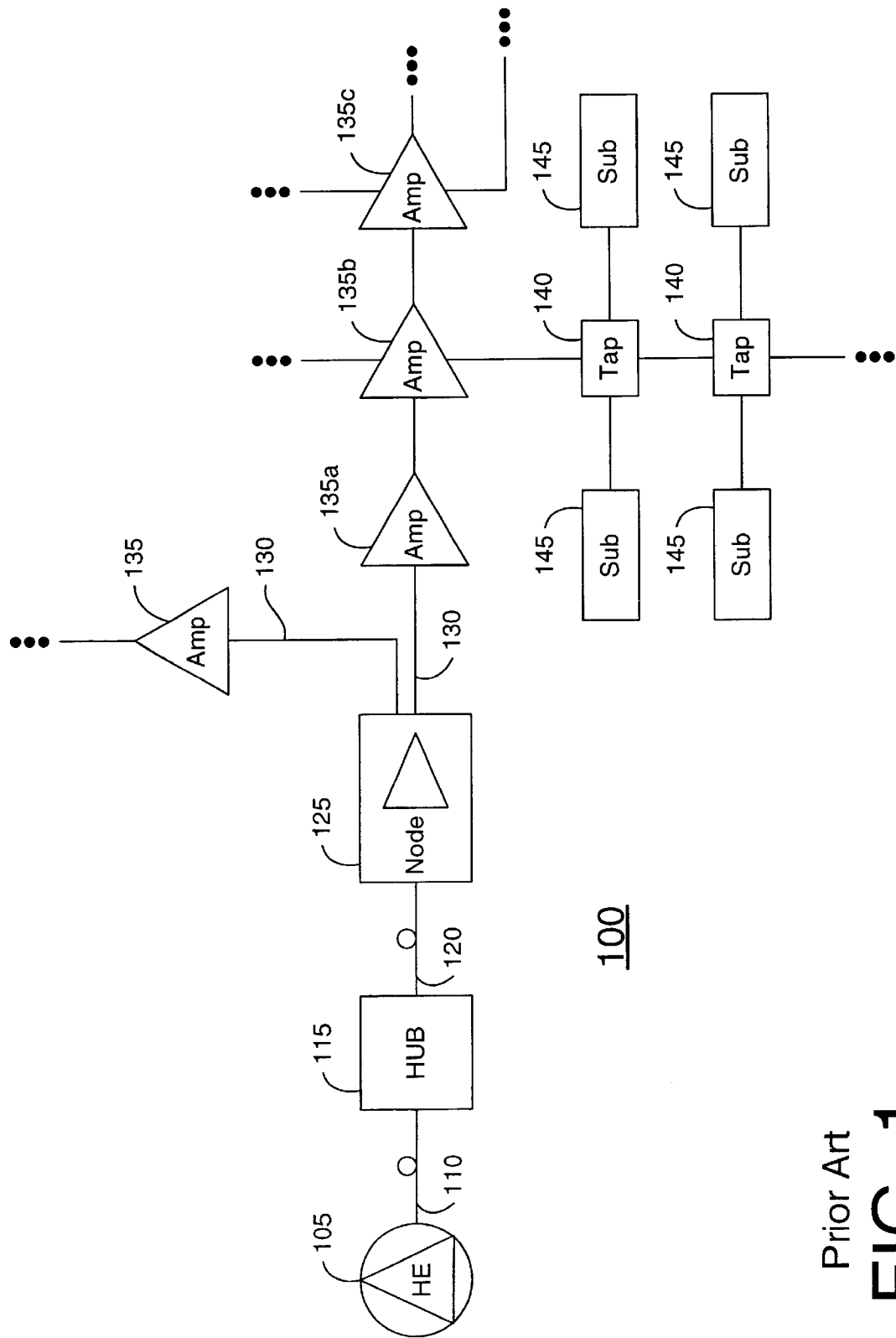
FIG. 1 is a block diagram illustrating an example of one branch of a conventional broadband communications system, such as a two-way hybrid/fiber coaxial (HFC) system, that carries optical and electrical signals.

Status monitoring devices can be included in various communications equipment, which are located throughout the broadband communications system 100 (FIG. 1). More specifically, the headend equipment 105 can include software to communicate with status monitoring transponders that may be located within optical nodes 125, amplifiers 135, and/or taps 140. System operators who utilize a status monitoring system can then monitor certain statistical data of the equipment in which they are installed, such as the power supply status, the gain control of the unit, and a service failure of the unit. In this manner, the transponders either respond to software commands or report data on their own regarding the particular communications equipment the transponder is monitoring.

Figure 2:
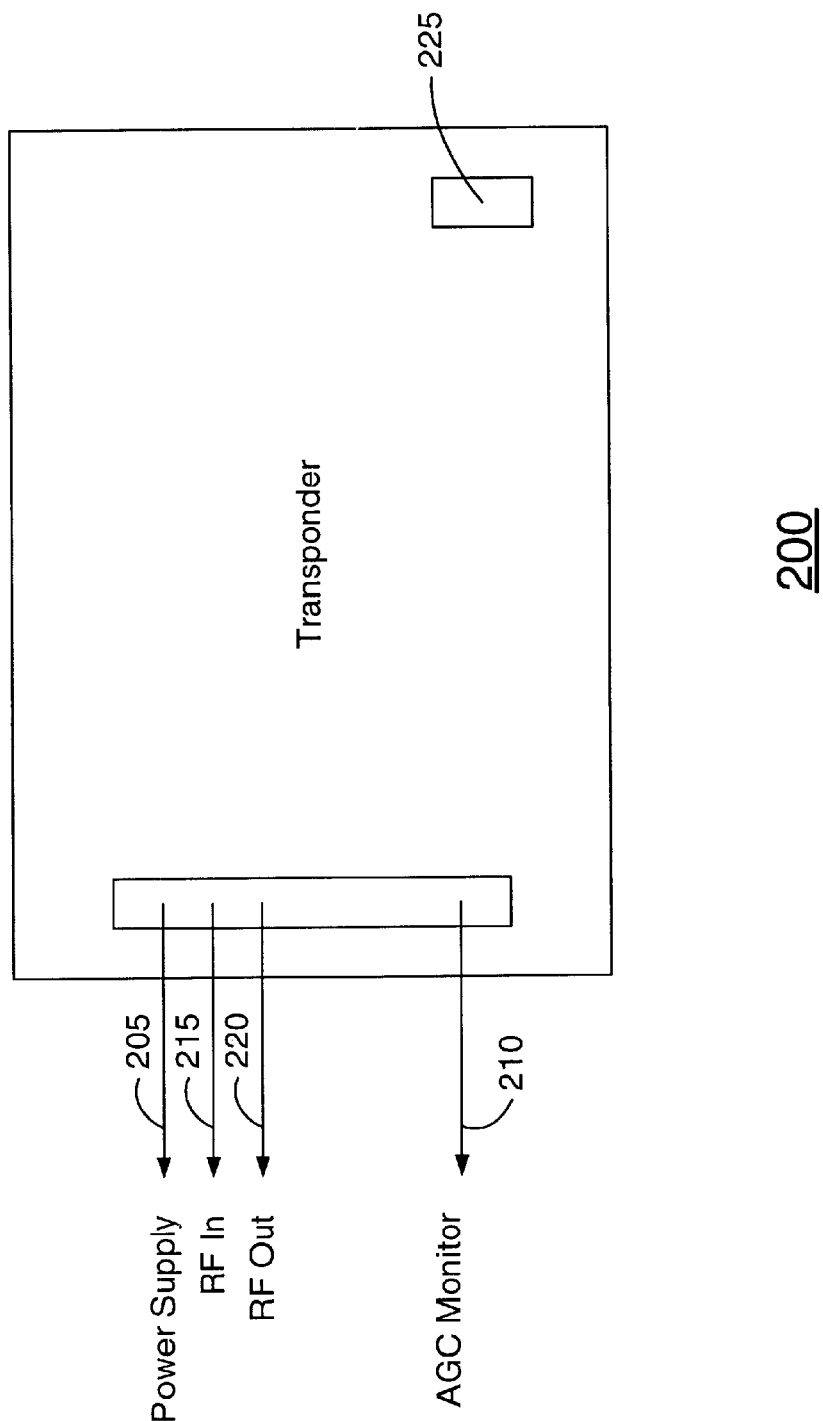
FIG. 2 illustrates a status monitor transponder that may be located in an optical node or an amplifier that is suitable for use in the broadband communications system of FIG. 1.

FIG. 2 illustrates a status monitor transponder 200 that may be located in, for example, an optical node 125 or an amplifier 135 that is suitable for use in the broadband communications system 100. The transponder 200 includes internal circuitry (not shown) that monitors the statistical data of the particular piece of equipment, such as an amplifier 135, and is configured in conjunction with a software program located in the headend equipment 105. A power supply connection 205 is used to connect the transponder 200 with the power supply of the unit for internal powering as well as monitoring the power supply. Another statistic may be to monitor the gain control of the unit with an automatic gain control (AGC) connection 210. An RF input connection 215 is used to receive instructions from the software system, and an RF output connection 220 is used to send data back to the software system over the reverse path.

Another connector 225 may be available to connect with a handheld controller to set-up and initialize the transponder 200. More specifically, a technician may connect a controller to the transponder 200 and set up the initial settings, such as a receive frequency that the transponder 200 is to receive commands from the headend and a transmit frequency that the transponder 200 is to transmit data to the headend. After initialization and set-up, the operator and headend personnel, in conjunction, will put the transponder 200 in an active state and check for set-up accuracies. Once the transponder 200 is set-up, all remaining communications will be through the software system unless a physical change is required in the transponder 200. For further information regarding a status monitoring system, refer to copending, commonly assigned patent application Ser. No. 09/489,534 filed Jan. 21, 2000 entitled "Transmission Network Control System" to Springer.

A Simplified Overview of a Amplifier and an Optical Node

Figure 3:
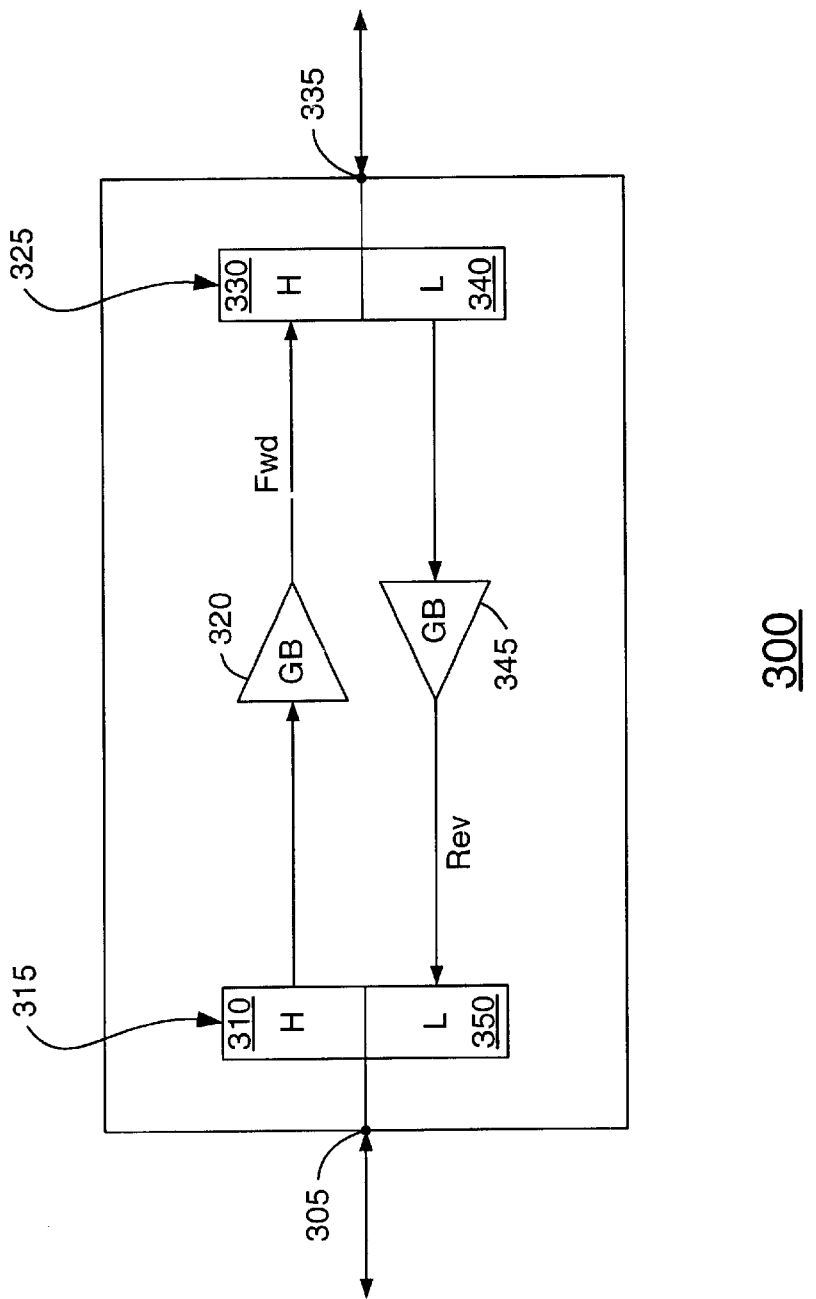
FIG. 3 illustrates a block diagram of an amplifier circuit that is suitable for use in an optical node or the broadband communications system of FIG. 1.

FIG. 3 illustrates a block diagram of an amplifier circuit 300. RF signals are provided to an input port 305 of the amplifier 300. The forward RF signals are filtered and isolated from the reverse signals by a highpass filter 310 that is included in a diplex filter 315. For example, the forward RF signals may be transmitted throughout a typical bandwidth of approximately 50 MHz to 860 MHz. A gain block 320 amplifies the forward signals and provides the amplified signal to a second diplex filter 325. The forward signals are filtered and isolated from the reverse signals by a second highpass filter 330, and the signals are then provided to an output port 335 of the amplifier for further transmission downstream to the subscriber's premise.

Reverse RF signals are routed similarly through the amplifier circuit 300. The reverse RF signals, which are typically transmitted throughout the bandwidth from 5 MHz to 42 MHz, are provided to the output port 335 of the amplifier 300. The reverse signals are isolated from the forward signals by a lowpass filter 340 in the diplex filter 325. A reverse gain block 345 amplifies the reverse signals and provides the amplified signals to a second lowpass filter 350 in diplex filter 315 for isolation from the forward signals. The reverse signals are then routed to the input port 305 of the amplifier 300 for further transmission upstream to the headend equipment.

It will be appreciated that a similar amplifier circuit 300 can also be included in an optical node. Briefly, the optical portion of the node receives optical signals in the forward path and converts the signals to electrical signals prior to delivery to the input port 305 of the amplifier portion 300. In the reverse path, the optical portion of the node receives the reverse electrical signals from the amplifier portion and, subsequently, converts the signals to reverse optical signals for transmission upstream throughout the fiber portion of the system.

An Exemplary Embodiment for an Ingress Monitoring Device

In an exemplary embodiment, the present invention provides an ingress monitoring device that detects ingress in communications equipment that are located throughout a broadband communications system. Additionally, the ingress monitoring device may gather statistical data regarding the type of ingress, the amount of ingress, the time of occurrence, and, maybe most importantly, the location of the communication equipment that has detected the ingress. A primary advantage of the present invention is to notify an operator that ingress is entering the system in a general location, despite the fleeting nature of ingress signals, without having to wait for a service call and then send out technicians to troubleshoot the system.

By way of example of an ingress monitoring system, consider that amplifiers 135a–c and optical node 125 in FIG. 1 each include an ingress monitoring device in accordance with the present invention. If significant ingress is detected by the ingress monitoring device that is installed in amplifier 135c, an alarm signal is sent over the reverse path to the headend. The alarm signal may include, among other statistical data, the equipment, such as amplifier 135c, that has detected the ingress. The operator then knows immediately that the point of ingress is occurring downstream from amplifier 135c. In comparison, if the amplifiers 135a–c and the optical node 125 do not include an ingress monitoring device, the operator would not even know the general point of ingress along the branch except with a service call from a subscriber. This would then require the field technicians to visit each station (i.e., each optical node and amplifier) along the branch until the problem is found, and if the ingress were fleeting, the technician would not be able to locate the fault until potentially the next occurrence. Therefore, in accordance with the present invention the operator saves a tremendous amount of time and effort in locating the fault without having to wait until next occurrence. Referring now to the drawings, in which like numerals represent like elements throughout the several figures, the present invention and an exemplary operating environment will be described.

Figure 4:
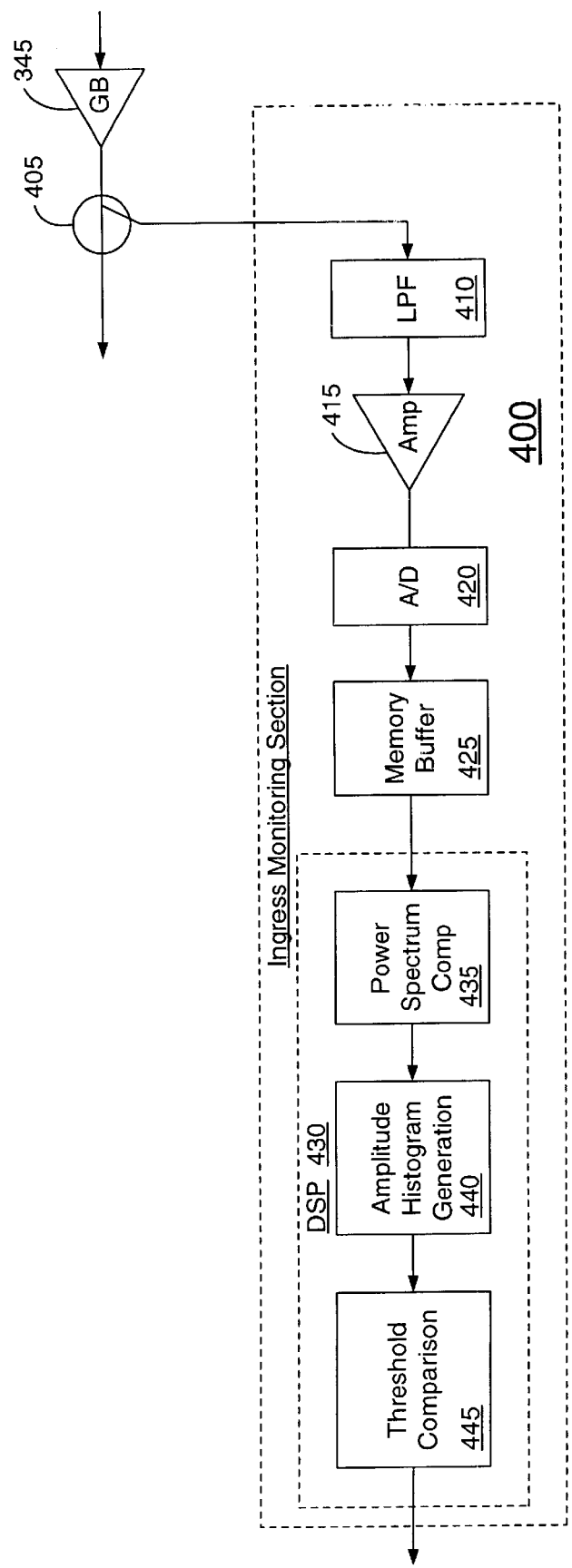
FIG. 4 illustrates a block diagram of an ingress monitoring device in accordance with the present invention that is suitable for use in the broadband communications system of FIG. 1.

FIG. 4 illustrates a block diagram of an ingress monitoring device 400 in accordance with the present invention. It will be appreciated that the ingress monitoring device 400 can be included in a plurality of communications equipment, such as amplifiers, optical nodes, or taps located throughout the system. The type of communication equipment is not necessarily important; but rather, the ingress monitoring device 400 is only limited to requiring an RF signal in which to monitor and power for operation, which can be from an internal or an external source. Additionally, FIG. 4 shows the ingress monitoring device 400 located after the reverse gain block 345 that is located in amplifier circuit 300 (FIG. 3); however, it can also be located in other places in the device and is not limited to the particular location shown. For example, referring to FIG. 3, the ingress monitoring device 400 can also be located immediately after lowpass filter 350 to ensure greater isolation of the reverse path signals.

Referring again to FIG. 4, a directional splitter 405 splits the reverse RF signal directing a portion of the signal to the ingress monitoring device 400. Within the monitoring device 400, a lowpass filter 410 filters out any out-of-band signals that would be aliased by sampling the signal for adequate monitoring. More specifically, in the preferred embodiment the lowpass filter 410 does not allow signals to pass that are at frequencies above half the Nyquist rate. Those skilled in the art will be familiar with the Nyquist theory, which states an analog signal must be sampled at a frequency that is greater than twice the maximum signal bandwidth in order to ensure that all information can be extracted and the inherent aliasing will not corrupt the original signal. In a typical broadband communications system, such as the system in FIG. 1, the reverse bandwidth ranges from 5 MHz to 42 MHz and, therefore, has a maximum signal bandwidth of 37 MHz. Two times 37 results in a 74 MHz, or Mega samples per second (Ms/s), and then that may be increased to 100 MHz for adequate sampling. The lowpass filter 410, therefore, filters out any signals that are above half the sampling frequency; in the above embodiment, the lowpass filter 410 filters out any signals above 50 MHz.

Amplifier 415 then amplifies the filtered signal. An analog-to-digital (A/D) converter 420 receives the amplified signal and digitizes the signal. The digital signal is then stored, essentially as a snapshot, in a memory buffer 425 for non-real time processing. The memory buffer 425, which preferably is a non-volatile memory device, has a storage capability that is dependent upon the resolution of the frequencies that the operator chooses to monitor. More specifically, if an operator chooses to monitor frequencies in 6 MHz sub-bands within the range from 5 MHz to 42 MHz, the required memory storage capability may be less than that compared to the memory storage required when the frequencies to be monitored are in less than 1 MHz sub-bands.

A digital signal processor (DSP) circuit 430 receives the snapshot signal, which is indicative of the reverse RF signal, from the memory buffer 425 at predetermined cycle times. Briefly, the DSP circuit 430 computes the power spectrum of the received signal and determines whether the signal includes unwanted ingress that may exist in the reverse RF signal. An objective of the DSP circuit 430 is to distinguish ingress signals from the noise floor and the desired reverse RF signals. The exemplary embodiment of the present invention achieves this objective by comparing the amplitudes of each signal. More specifically, the ingress signals will be greater in amplitude than the noise floor and lower in amplitude than the desired reverse signals. Another embodiment of the present invention may be that the ingress signal has a greater amplitude than the reverse signal.

The DSP circuit 430 could be implemented with a software-based digital signal processor device, such as Analog Devices' AD2189 processor. Alternatively, a field programmable gate array (FPGA) can be used, which is available from Altera or Xilinx, or an application specific integrated circuit (ASIC) where the computation results from the hardware connection of gates instead of processing with software. The exemplary embodiment describes using the software-based digital signal processor device. It will be appreciated, however, that implementation of the FPGA or the ASIC would involve a version of the software algorithm described hereinbelow in addition to hardware components.

Figure 5:
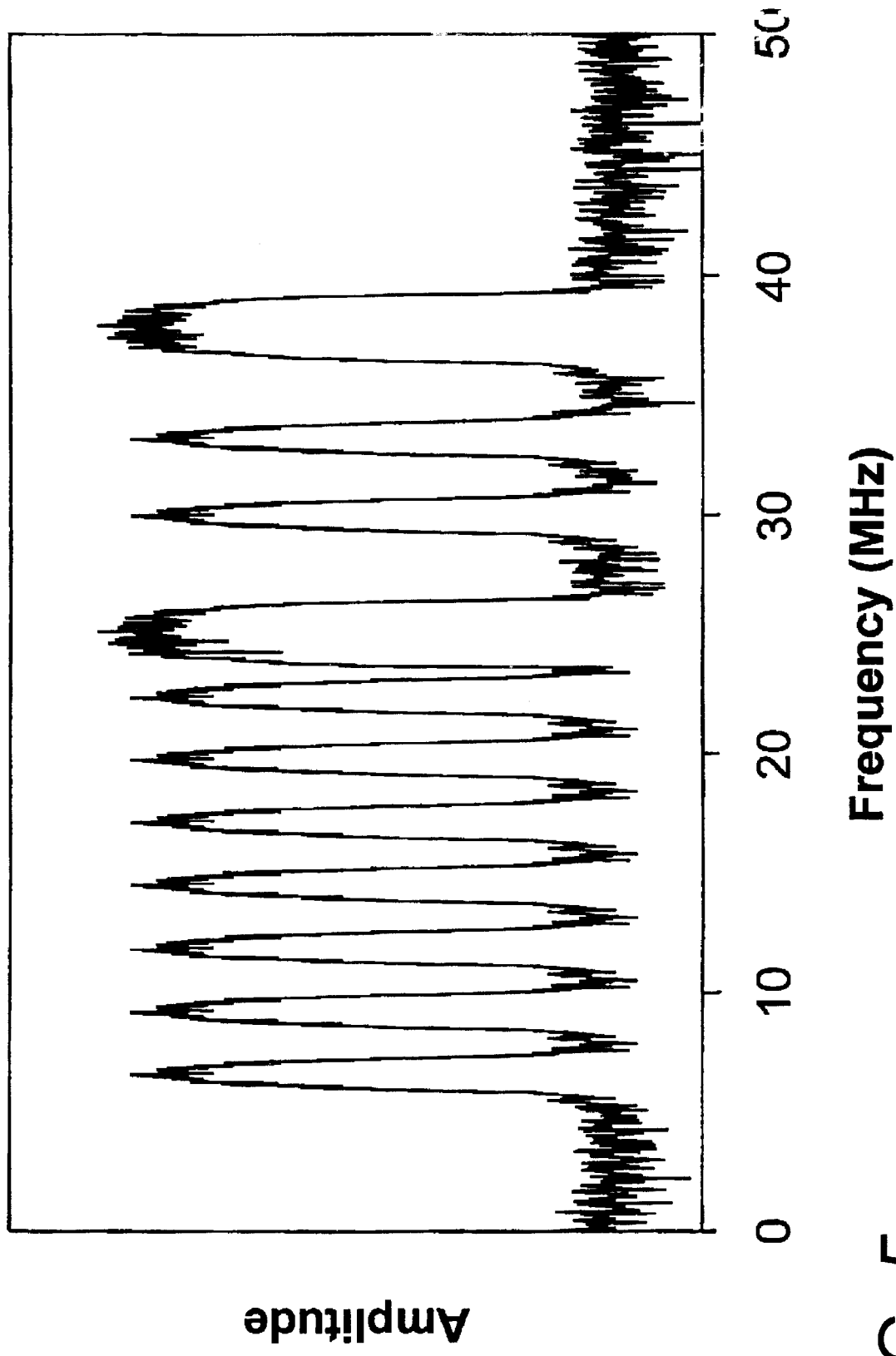
FIG. 5 is a graph illustrating a typical reverse band plotting several carrier signals throughout a frequency range.

In accordance with the present invention, to identify and determine the individual signals (i.e., the noise floor, ingress signals, and desired reverse RF signals, e.g., carrier signals), a power spectrum computation circuit 435 first resolves, or separates, the reverse band into its constituent parts, or sub-bands. For example, FIG. 5 is a graph illustrating a typical reverse band plotting several carrier signals throughout a frequency range that can be separated into sub-bands. It will be appreciated that generally reverse carrier signals are "burst-mode", i.e., not all carrier signals are on at the same time or are on all the time as shown; however, they are shown as a snapshot for illustration purposes. In FIG. 5, carrier signals having a known amplitude are sent in the band in known frequencies ranging from about 5 MHz to 42 MHz. The power spectrum computation circuit 435 receives a similar snapshot from the memory buffer 425 and then separates this band into the desired sub-bands for further evaluation. The sub-bands may be, for example, resolved into different frequencies that include just the known frequencies that carry the carrier signals. Again, however, the sub-bands may be separated into 6 MHz blocks, a 1 MHz block, or blocks less than 1 MHz depending upon the requirements of the operator.

The power spectrum computation circuit 435, after separation, then computes the power of each of the separated sub-bands. The separation and power computation is accomplished by using, for example, a fast Fourier transform (FFT), a discrete cosine transform (DCT), or a digital filter bank to isolate the sub-band from the reverse band prior to or in conjunction with the estimation of the signal power contained in each sub-band. In either way, the result is equivalent for the purposes of the present invention.

Figure 6:
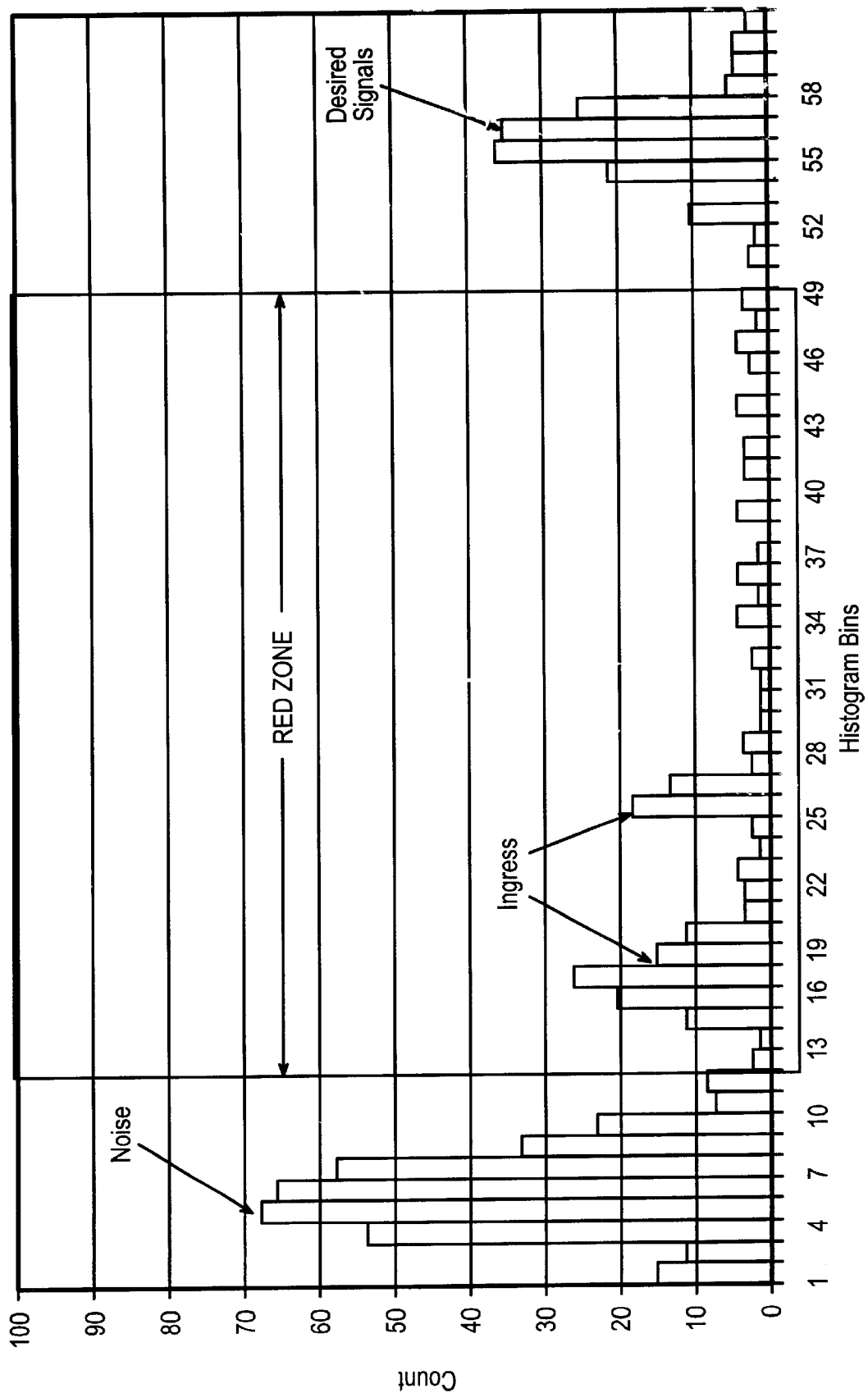
FIG. 6 is a graph illustrating an example histogram chart of one sub-band in the reverse band in accordance with the present invention.

FIG. 6 is a graph illustrating an example histogram chart of one sub-band in accordance with the present invention. The power spectrum for the desired resolution of the sub-band is provided to an amplitude histogram generation circuit 440, which charts the power of each sub-band in the respective sub-band histogram bins, where the number of bins depends upon a second resolution, and where the lower bins represent a lower power level and the higher bins represent a higher power level. For example, the number of histogram bins as shown in FIG. 6 is approximately sixty. It will be appreciated that there are sub-band histogram charts for each monitored frequency in the reverse band. As mentioned, the process of computing the power spectrum and updating the histogram charts are repeated continuously at the predetermined cycle time. This process, however, is not time constrained and can be cycled at any operator-chosen interval, such as every 30 seconds or every five minutes.

Histories of the power estimate for each sub-band are then maintained in the predetermined histogram bins. FIG. 6 charts the history of one sub-band after receiving a plurality of snapshots, which essentially sums the amplitudes in the respective bin for each new snapshot cycle and are recorded as counts. For example, if an operator chooses one (1) minute for each cycle, the count then updates every minute with a new snapshot of the sub-band's power computation, which is charted in the proper bin depending upon the power level. When ingress signals or the desired carrier signal for the particular sub-band being monitored are not present in the reverse RF signal, bins associated with the expected noise floor continue to increment with each count, or new snapshot, and a peak is observed in the histogram chart at the most probable power amplitude of the noise floor. When a desired carrier signal is present in a snapshot, despite the fact that noise or ingress signals may be present, the bins associated with the desired carrier signal will be incremented and a peak will be observed in the histogram chart at the most probable amplitude of the desired carrier signal. When the desired carrier signal is not present, however, and ingress signals are present, which have amplitudes above the noise floor and below the desired signal, amplitudes associated with the ingress signals peak within the region referred to as the red zone. It will be appreciated that the operator, depending upon their system specifications, can determine the red zone, which is a predetermined threshold value. There are typically histogram bins within the red zone that do increment slowly due to a desired carrier signal transitioning between on and off during the time a snapshot is taken, though this will be infrequent and does not appear as a significant ingress problem, which is discussed further hereinbelow.

Referring to FIG. 4, a threshold comparison circuit 445 receives the information stored in the histogram generation circuit 440 and compares each different histogram chart with the predetermined threshold value. The operator via, for example, a handheld controller or a software program in the headend, enters the threshold value and an optional tolerance value, or alternatively a factory-selected ingress monitoring device 400 may include the threshold value that are supplied by the manufacturer. It will be appreciated that the values may be the same or a different value for each monitored sub-band. A peak in the amplitude of one or more histogram bins within the red zone indicates that ingress is included in the reverse band affecting that particular sub-band. An alarm signal is then sent from the threshold comparison circuit 445 to the output of the ingress monitoring device 400. The alarm signal may pass a single message indicating that there is unwanted ingress detected within the reverse band including a coded number that represents the particular piece of communications equipment that is being monitored. Alternatively, the alarm signal could also include additional information, such as the specific frequency affected, for example, at 5 MHz within the reverse band. Additionally, the alarm signal could include the power and occurrence rate determined by the number of snapshots that have been accrued.

Figure 7:
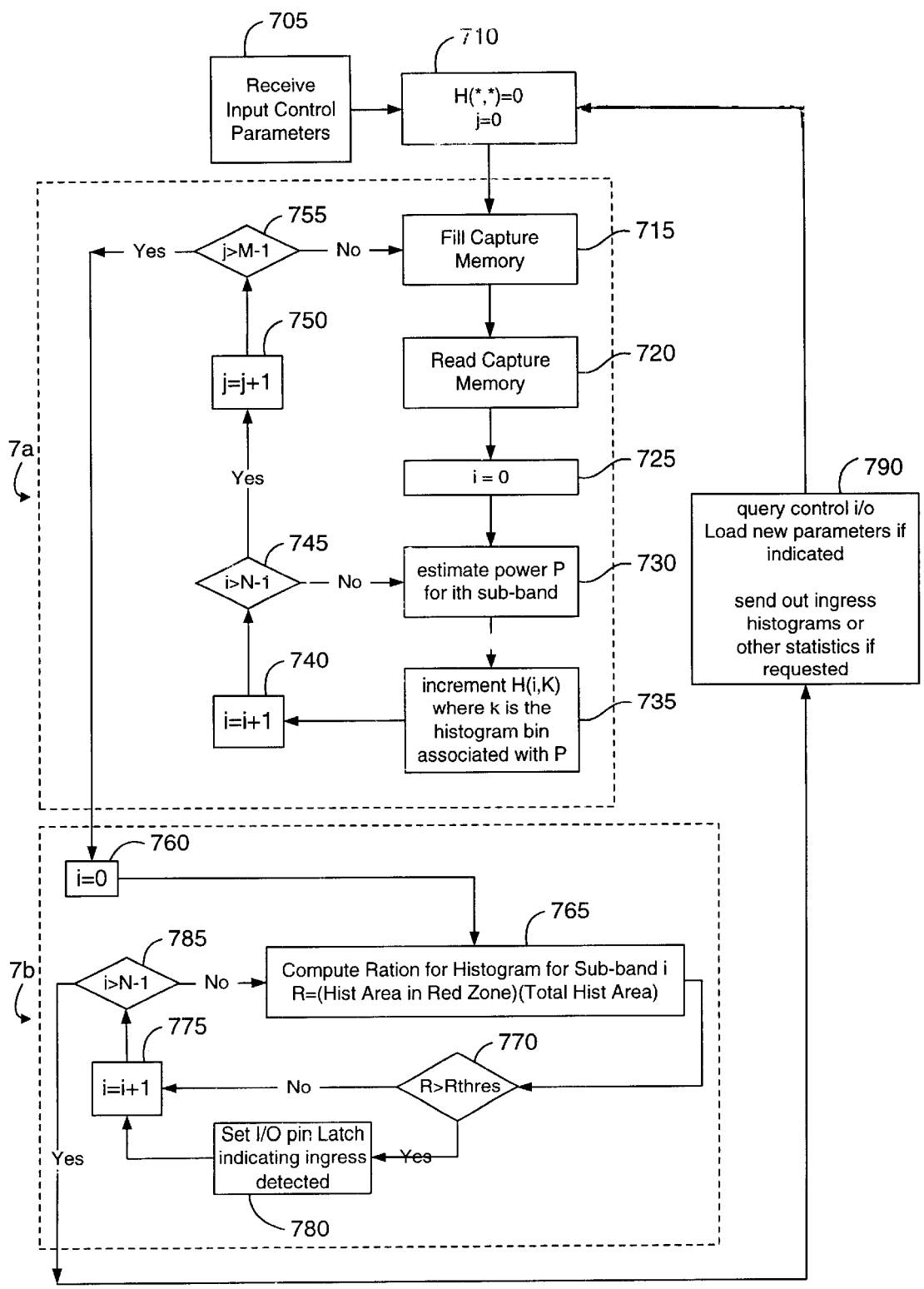
FIG. 7 is a flowchart of the steps in accordance with the present invention performed by the DSP circuit that is included in the ingress monitoring device of FIG. 4.

FIG. 7 is a flowchart of the steps in accordance with the present invention performed by the DSP circuit 430. In step 705, the DSP circuit 430 is initialized and receives the input control parameters that are predetermined either by the manufacturer or the operator. The histogram arrays and counters are then initialized in step 710. For example, H(i, k) signifies the $k^{th}$ bin for sub-band$_i$.

Block 7a includes steps performed in both the power spectrum computation circuit 430 and the amplitude histogram generation circuit 440 that increments the histograms for the desired sub-bands. In step 715, the DSP circuit 430 sets an output pin that activates external circuitry to fill the the memory buffer 425. The DSP circuit 430 then waits for a signal on an input pin indicating that the memory buffer 425 is full and ready to send data, then in step 720, the memory buffer 425 is read. In step 725, the DSP circuit 430 zeroes the sub-band counter i. The power computation circuit 435, in step 730, isolates sub-band$_i$ and then estimates the power P for the $i^{th}$ sub-band. As mentioned above, fast Fourier transforms, discrete cosine transforms, or the digital filter bank to name but a few processes can implement this computation. In step 735, the amplitude histogram generation circuit 440 determines which histogram bin corresponds to the amplitude of P and increments that bin accordingly. For example, if the power P corresponds to a carrier signal, a carrier bin is incremented, such as bin 55 as shown in FIG. 6. The sub-band counter is then incremented in step 740. In step 745, it is determined whether all the sub-band histogram charts N have been updated with power estimates from the latest snapshot. If not, the DSP circuit 430 loops back to step 730 to estimate the power P for the next sub-band$_i$. When all the sub-bands have been evaluated, in step 750, a snapshot counter is incremented. In step 755, the number of snapshots M that have been received is evaluated. If the desired number of snapshots has not been achieved, the DSP circuit 430 returns to step 715 to evaluate a new snapshot of the reverse RF signal. Otherwise, the DSP circuit 430 continues to Block 7b to compare each histogram chart with the criteria that indicates significant ingress.

Briefly, the significance of an ingress signal depends upon its position on the horizontal axis of the histogram chart and on the histogram area, or counts, induced by the ingress signal. The position on the horizontal axis indicates the amplitude of the ingress, which can be used to deduce the signal-to-ingress ratio. The histogram area associated with the ingress signal, i.e., the count axis, indicates how frequently the ingress is occurring dependent upon the predetermined cycle time. For example, referring to FIG. 6, ingress signals that are detected in the upper bins of the red zone, such as bins 40–49 as shown, having a large area are more significant than ingress signals having a large area in bins 13–19. In this manner, a weighting function can be applied in determining the significance of detected ingress signals, where ingress signals in the higher number bins are weighted more significantly than ingress signals in the lower number bins.

Block 7b includes steps performed in the threshold comparison circuit 445 that compares each histogram with the criteria, i.e., the threshold values, that may indicate significant ingress in the reverse band. In step 760, the sub-band counter is zeroed in preparation for examining all the sub-band histograms. The DSP circuit 430, in step 765, then computes the ratio of the histogram area contained in the red zone to the total area under the histogram to get the value R for the sub-band$_i$. In step 770, the value R is compared with the predetermined threshold value $R_{thres}$ to determine whether the ingress that has accumulated in the histogram chart is considered significant. If the ingress is not significant, in step 775, the sub-band counter is incremented. If, however, the ingress is significant, in step 780, the threshold comparison circuit 445 latches an output pin to indicate to external circuitry, such as a status monitoring transponder, that ingress has been detected and then proceeds to step 775. In step 785, the DSP circuit 430 determines if all the sub-bands have been evaluated. If not, the DSP circuit 430 returns to step 765. If all the sub-bands have been evaluated, in step 790, the control input pins of the DSP circuit 430 are checked to identify if any predetermined control parameters, such as the red zone, M, N, or $R_{thres}$, determined by the operator are to be changed. After step 790, the DSP circuit 430 returns to step 710 and restarts the cycle.

The monitoring and response statistical data of the ingress monitoring device 400 are adjustable upon the requirements and needs of the operator. For example, step 790 could also include sending out ingress histogram chart statistical data if requested by the operator. For example, routines added to the DSP circuit 430 could allow the operator to get detailed information about the frequencies, levels, and statistical occurrences of the ingress signals. In the preferred embodiment of the assignee, the statistical data and alarm signals are set up and received via the status monitoring system that includes a transponder in the desired equipment that communicates with either ingress monitoring software or incorporated in the status monitoring software that is located in headend equipment. Alternatively, however, the alarm signal can include header information that can be routed through the communications system to a processor in the headend and is, therefore, not limited to use with only the status monitoring system.

In summary, the ingress monitoring device 400 of the present invention monitors communications equipment throughout the broadband communications system for detection of ingress signals. In this manner, the monitoring device 400 sends an alarm signal and other data including the general location of the point of ingress within the ingress monitoring system to the headend equipment.

What is claimed is:

1. In a broadband communications system having forward and reverse paths, the forward and reverse paths including communications equipment for transmitting forward and reverse signals, respectively, in predetermined frequency bands, the forward and reverse signals including noise signals and carrier signals, the communications equipment including an ingress monitoring device for monitoring the reverse signals and for detecting ingress signals that may be present along with the noise and carrier signals, the ingress monitoring device comprising:

a processor for resolving the reverse signals into predetermined sub-bands at a first resolution, and for computing a power level for each of the sub-bands, and for comparing the power level that is indicative to the power level of the ingress signals for each of the sub-bands with a predetermined threshold value, wherein when ingress signals are present along with the reverse signals, the processor provides an alarm signal that indicates the specific communications equipment in which the ingress signals have been detected.

2. The broadband communications system of claim 1, the ingress monitoring device further comprising:

a memory buffer for storing and providing a snapshot of the reverse signals to the processor.

3. The broadband communications system of claim 2, wherein a new snapshot is provided to the processor on a predetermined cycle.

4. The broadband communications system of claim 3, wherein the ingress monitoring device receives a portion of the reverse signals, and wherein an analog-to-digital converter digitizes the portion of the reverse signals and provides a digital signal to the memory buffer.

5. The broadband communications system of claim 4, wherein the portion of the reverse signals are amplified with an amplifier and provided to the analog-to-digital converter.

6. The broadband communications system of claim 1, wherein the processor comprises:

a power computation circuit for resolving the reverse signals and for computing the power level for each of the sub-bands; and a threshold comparison circuit for comparing the power level that is indicative to the power level of the ingress signals for each of the sub-bands with the predetermined threshold value.

7. The broadband communications system of claim 1, wherein the processor comprises:

an amplitude histogram generation circuit for charting the power level of each of the sub-bands in a plurality of histogram bins, wherein the plurality of histogram bins are dependent upon a second resolution.

8. The broadband communications system of claim 7, wherein a history, defined by a predetermined value, of the power levels of each of the sub-bands is accrued in the plurality of histogram bins with each new snapshot, and wherein the power level charted in specific histogram bins are indicative to the power level associated with one of the noise signals, the ingress signals, and the carrier signals.

9. Communications equipment including an ingress monitoring device for transmitting reverse signals, the reverse signals comprising noise signals and carrier signals, the ingress monitoring device for detecting ingress signals that may also be present with the reverse signals, a method for detecting the ingress signals, the steps comprising:

resolving the reverse signals into predetermined sub-bands;

computing a power level for each of the sub-bands;

comparing the power level that is indicative of the power level of the ingress signals for each of the sub-bands with a predetermined threshold value, wherein if ingress signals are present along with the reverse signals, an alarm signal is provided that indicates ingress signals have been detected within the communications equipment.

10. The method of claim 9, the steps, prior to resolving the reverse signals, further comprising:

splitting a portion of the reverse signals;

filtering the portion of the reverse signals;

amplifying the filtered signal;

digitizing the amplified signal;

storing the digital signal in a memory buffer; and providing the stored digital signal that is indicative of the reverse signals.

11. The method of claim 9, wherein the steps, subsequent to computing the power level for each of the sub-bands, further comprise:

charting the power level for each of the sub-bands in histogram bins, wherein specific histogram bins are indicative of the noise signals, the ingress signals, and the carrier signals.

12. An ingress monitoring device for receiving reverse signals in a predetermined frequency band and for detecting ingress signals, the ingress monitoring device comprising:

a processor, comprising:

a power spectrum computation circuit for resolving the reverse signals into predetermined sub-bands, and for computing a power level for each of the sub-bands;

an amplitude histogram generation circuit coupled to the power spectrum computation circuit for charting the power level of each of the sub-bands in a plurality of histogram bins;

a threshold comparison circuit coupled to the amplitude histogram generation circuit for comparing the power level charted in the histogram bins that are indicative to the power level of the ingress signals for each of the sub-bands with a predetermined threshold value.

13. The ingress monitoring device of claim 12, further comprising:

a splitter for splitting a portion of the reverse signals;

a filter coupled to the splitter for filtering out unwanted signals above the predetermined frequency band of the reverse signals;

an amplifier coupled to the filter for amplifying the filtered signals;

an analog-to-digital (A/D) converter coupled to the amplifier for digitizing the amplified signals; and a memory buffer coupled to the A/D converter for providing the digital signal as a snapshot to the power spectrum computation circuit.

14. The ingress monitoring device of claim 13, wherein the ingress monitoring device is used in communications equipment.

15. In communications equipment for transmitting forward and reverse signals in a broadband communications system, the reverse signals comprising noise signals and carrier signals, the communications equipment for monitoring and providing an alarm signal when ingress signals are present along with the reverse signals, the communications equipment comprising:

an input port for receiving the reverse signals;

a splitter for splitting the reverse signals;

an ingress monitoring device for receiving a portion of the reverse signals and for monitoring the received reverse signals for the presence of ingress signals, the ingress monitoring device comprising:

a processor for resolving the portion of the reverse signals into predetermined sub-bands at a first resolution and for computing a power level for each of the sub-bands, and for comparing the power level that is indicative to the power level of the ingress signals for each of the sub-bands with a predetermined value, wherein when ingress signals are present along with the reverse signals, the processor provides an alarm signal that indicates the specific communications equipment in which the ingress signals have been detected.

16. The communications equipment of claim 15, wherein the alarm signal is provided to a headend in the broadband communications system.

* * * * *